March 11, 1952   J. E. MOISE ET AL   2,589,112
ABSORPTION OF KETENE
Filed Oct. 30, 1948
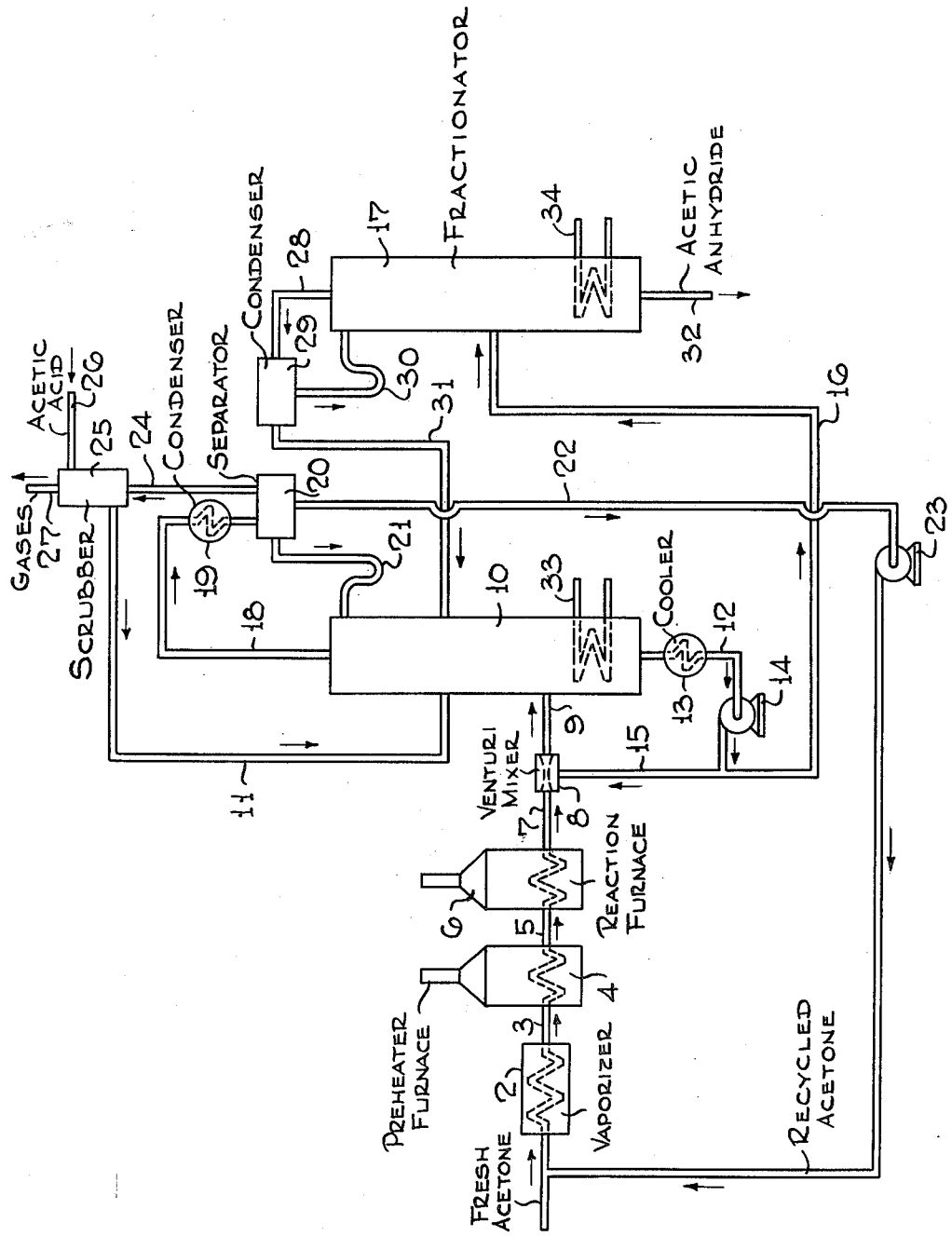
James E. Moise
William D. Luening   Inventors
William G. Daroux
By Henry Berk   Attorney Patented Mar. 11, 1952

2,589,112

UNITED STATES PATENT OFFICE 2,589,112

ABSORPTION OF KETENE

James E. Moise and William D. Luening, Baton Rouge, La., and William G. Daroux, Coventry, England, assignors to Standard Oil Development Company, a corporation of Delaware Application October 30, 1948, Serial No. 57,562

3 Claims. (Cl. 260—546)

This invention relates to improvements in the production of organic compounds of the type of ketene ($CH_2:CO$) and its homologs and to the production of acid anhydrides, such as acetic anhydride, therefrom.

Various methods for the production of ketene or its homologs are known. In general, these methods comprise cracking ketones, organic acid or acid anhydrides. For example, acetone may be cracked at high temperatures to yield ketene itself and methyl ethyl ketone may be so treated to yield a mixture of methyl ketene and ketene. The ketenes are highly reactive compounds and are used as intermediates in the production of a large number of organic compounds. For example, they may be reacted with acids to yield anhydrides, with alcohols to yield esters, etc.

A particularly valuable reaction is that of ketene itself with acetic acid to yield acetic anhydride which is useful in the preparation of cellulose esters. In this process acetone is cracked at high temperatures and at short contact times to produce ketene which is then passed countercurrently to acetic acid in a tower to produce acetic anyhydride. Unreacted acetone and some acetic acid are removed overhead and acetic anhydride-acetic acid mixture is taken off the bottom.

However, one of the major difficulties encountered in the utilization of ketene in this manner is the rapidity with which it polymerizes both in the pure state and in inert solvents under ordinary conditions.

It has previously been proposed to suddenly chill or quench the ketene as it flows from the converter in order to reduce it to a temperature at which it will not easily undergo polymerization. The quenching has been accomplished by the use of inert materials and also materials which react with the ketene before it has had time to polymerize. Cooling and absorption have also been accomplished by placing the absorber tower as close as possible to the reaction furnace and passing the gases directly into the absorber tower. These prior methods, however, have not been too successful in preventing loss of ketene.

It is, therefore, the object of this invention to provide a method for simultaneously quenching and reacting ketene without undue loss of ketene.

The method of practicing this invention will be apparent from the following description together with the drawing which is a diagrammatic layout of the system of this invention.

Referring more specifically to the drawing, numeral 2 represents vaporizer means for acetone, which may be a simple coil as shown or a metal still pot or the like. The vaporizer is connected by line 3 to preheater 4 which likewise may be of simple construction, comprising merely an S-coil or the like.

The preheater is connected by conduit 5 to pyrolysis chamber 6 which may be a single tube or coil or other type of enclosed chamber. The coil may be copper or other desired alloy, such as stainless steel containing a large amount of chromium.

A particularly suitable alloy for use in the chamber 6 is

| | |
|---|---|
| Chromium | 22–27% |
| Nickel | 12–22% |
| Carbon | Less than 0.25% |
| Balance | Substantially iron | as disclosed and claimed in copending application, Serial No. 1,943, filed January 13, 1948, now abandoned.

Chamber 6 is connected by line 7 to Venturi mixer 8 which is connected by line 9 to tower 10.

Tower 10 is provided with conduit means 11, for introducing fresh acetic acid, conduit 31 for returned recovered acetic acid to be reacted with ketene, and with draw-off means 12, connected by cooler 13, pump 14 and line 15 with Venturi mixer 8 and by line 16 with fractionator tower 17. The upper part of tower 10 is provided with vapor take-off 18, which passes through condenser 19 to separator 20. Gases including acetone unconverted in the process are removed through line 18 and passed to separator 20 where the acetone is refluxed to the tower 10 through line 21 and returned to the system through line 22 and pump 23. Gases leaving separator 20 through conduit 24 pass through scrubber 25 provided at its top with means 26 for introducing scrubbing liquid (acetic acid) to recover entrained acetone as described in copending application U. S. Ser. No. 755,868, filed June 20, 1947, now U. S. Patent 2,509,877 granted May 30, 1950. The scrubbed gases leave through vent line 27 and the scrubber is connected at its bottom with line 11 into the tower 10. Tower 17 is provided with vapor take-off 28 and condenser 29 which is connected to reflux line 30 and with tower 10 by means of conduit 31. Means are provided in tower 10 and fractionator 17 for supplying heat, such as steam coils 33 and 34.

The invention may be further understood by consideration of the following more detailed description. This description is set forth for the purpose of illustrating the invention; hence it is to be understood that the specific values and materials described are not to be construed as limiting the invention.

Referring, therefore, again to the drawing, acetone is vaporised and preheated to 1150° F. in preheater 4 and then passed to pyrolyzer 6 where it is heated to a temperature of 1300° F. with a mass velocity of 25 lbs. of acetone per second per square foot to give a contact time of 0.3 to 0.5 of a second. Under these conditions, about 15% of the acetone is converted with about 80% selectivity to ketene. In order to prevent polymerization of ketene, the effluent gases from the pyrolysis chamber are immediately quenched to temperatures below 300° F. in venturi 8 with a mixture of 75%–10% acetic acid and 25%–90% acetic anhydride. The Venturi mixer with the liquid injected at the throat into the hot gases which have a velocity of 200–500 ft./sec. gives a high degree of turbulence resulting in thorough mixing and substantially complete absorption of ketene. The ratio of quench liquid to gas should be such that there is always sufficient free acetic acid to react completely with the ketene. The mixture of acetic acid and acetic anhydride used for quenching the ketene is preferably drawn off from tower 10 through line 12. The mixture resulting from the quench is passed to tower 10 through line 9 where it is contacted countercurrently with glacial acetic acid introduced through lines 11 and 31 in order to convert any unreacted ketene that may be swept out with the fixed gases and acetone. The tower 10 also acts as a heat exchanger with the cold fresh acid entering through line 11 and the recovered acid entering through line 31, absorbing the heat of reaction and further cooling the product entering through line 9. The top section of the tower 10 serves as a fractionation section to effect the relatively easy separation between acetone and acetic acid and by reboiling any acetone that reaches the bottom of the tower by means of steam coil 33, eventually all of the acetone must leave in the top gases. A mixture of acetic acid and product acetic anhydride is removed from the bottom of the tower 10 through line 12 and is pumped by line 15 to venturi 8 where it is mixed with effluent vapors from the chamber 6. By injecting this recycle acetic anhydride-acetic acid mixture into the hot gas stream at the throat of a venturi, excellent mixing is obtained, thereby immediately cooling the vapors and absorbing the ketene. Sufficient recycle product is returned to the outlet of chamber 6 to reduce the temperature to 200–300° F. preferably below 250° F. Another portion of the bottoms from tower 10 is passed through line 16 to the midsection of fractionator 17 where separation is effected between the acetic acid and the acetic anhydride, the former being recycled to tower 10 through line 28, condenser 29 and line 31, and the latter withdrawn through line 32. Part of the condensate from condenser 29 is returned to fractionator 17 through line 30 for reflux.

Unconverted acetone, some acetic acid and fixed gases (largely methane, carbon monoxide and ethylene) are passed overhead from tower 10 through line 18 to condenser 19 where the bulk of the acetone is condensed and passed to separator 20. A portion of the acetone is returned to tower 10 through line 21 as reflux. The remaining portion is returned to the feed line 1 through line 22. Fixed gases containing a small amount of acetone are passed by line 24 to scrubber 25 where they are contacted countercurrently with glacial acetic acid introduced through line 26. The temperature in this scrubber should be maintained as low as possible without refrigeration down to the freezing point of the acid (60° F.). The acetic acid enriched with acetone scrubbed out of the gases is passed by line 11 to the middle of tower 10.

The nature and objects of the present invention having been thus described and illustrated, what is claimd as new and useful and is desired to be secured by Letters Patent is:

1. In a process for preparing acetic anhydride by pyrolyzing acetone to yield a hot vapor stream of pyrolysis products at a temperature in the range of 1150° F.–1300° F. consisting essentially of ketene, unreacted acetone and fixed gases, and thereafter reacting the ketene so produced with acetic acid to produce acetic anhydride, the improvement which comprises immediately jet mixing said hot vapor stream of pyrolysis products with a cooled quenching liquid mixture of acetic anhydride and acetic acid to quench said pyrolysis products to a temperature of 200° F.–300° F., whereby the acetic acid reacts substantially completely with the ketene to produce additional acetic anhydride, continuously passing the resulting quenched mixture into a contacting zone in which unconverted acetone vapor and fixed gases are continuously separated from a liquid mixture of acetic acid and acetic anhydride, passing the thus separated acetone vapor and fixed gases in said contacting zone countercurrent to additional acetic acid introduced as a stream into an upper part of said contacting zone, removing the unreacted acetone vapor and fixed gases overhead from said contacting zone, commingling said additional acetic acid with the liquid mixture of acetic acid and acetic anhydride at a bottom part of the contacting zone, withdrawing a portion of the thus obtained liquid mixture replenished with said additional acetic acid at the bottom part of said contacting zone, cooling said withdrawn portion of the liquid mixture and using it as said quenching mixture for the jet mixing with said hot vapor stream of pyrolysis products.

2. The process as defined in claim 1, in which the cooled liquid quenching mixture withdrawn from the bottom part of said contacting zone is inducted into a Venturi jet of the hot vapor stream of pyrolysis products for the jet mixing.

3. A process as defined in claim 1, said quenching mixture being a mixture of 75% to 10% acetic acid with 25% to 90% acetic anhydride.

JAMES E. MOISE.
WILLIAM D. LUENING.
WILLIAM G. DAROUX.

REFERENCES CITED

The following references are of record in the file of this patent:

UNITED STATES PATENTS

| Number | Name | Date |
| --- | --- | --- |
| 1,859,992 | Seil | May 24, 1932 |
| 2,099,909 | Steiks et al. | Nov. 23, 1937 |
| 2,235,561 | Nadeau et al. | Mar. 18, 1941 |
| 2,385,475 | Sconce | Sept. 25, 1945 |

FOREIGN PATENTS

| Number | Country | Date |
| --- | --- | --- |
| 377,574 | Great Britain | July 28, 1932 |